United States Patent
Beyerlein et al.

(10) Patent No.: US 12,264,216 B2
(45) Date of Patent: Apr. 1, 2025

(54) POLYURETHANE AEROGELS

(71) Applicant: RAMPF Advanced Polymers GmbH & Co. KG, Grafenberg (DE)

(72) Inventors: Gerd-Sebastian Beyerlein, Metzingen (DE); Annabelle Krauß, Grafenberg (DE); Michael Kugler, Pirmasens (DE)

(73) Assignee: RAMPF Advanced Polymers GmbH & Co. KG, Grafenberg (DE)

( * ) Notice: Subject to any disclaimer, the term of this patent is extended or adjusted under 35 U.S.C. 154(b) by 26 days.

(21) Appl. No.: 17/600,500

(22) PCT Filed: Mar. 31, 2020

(86) PCT No.: PCT/EP2020/059049
§ 371 (c)(1),
(2) Date: Sep. 30, 2021

(87) PCT Pub. No.: WO2020/201253
PCT Pub. Date: Oct. 8, 2020

(65) Prior Publication Data
US 2022/0162373 A1    May 26, 2022

(30) Foreign Application Priority Data
Apr. 1, 2019  (DE) .................. 10 2019 204 570.7

(51) Int. Cl.
*C08G 18/08* (2006.01)
*C08G 18/10* (2006.01)
*C08G 18/20* (2006.01)
*C08G 18/76* (2006.01)
*C08J 9/28* (2006.01)
*C08J 11/24* (2006.01)
C08G 101/00 (2006.01)

(52) U.S. Cl.
CPC ............ *C08G 18/14* (2013.01); *C08G 18/10* (2013.01); *C08G 18/2063* (2013.01); *C08G 18/7671* (2013.01); *C08J 9/286* (2013.01); *C08J 11/24* (2013.01); C08G 2101/00 (2013.01); C08G 2110/0041 (2021.01); C08G 2110/0091 (2021.01); C08G 2330/00 (2013.01); C08J 2201/0502 (2013.01); C08J 2201/0542 (2013.01); *C08J 2205/026* (2013.01); *C08J 2205/042* (2013.01); *C08J 2375/12* (2013.01)

(58) Field of Classification Search
CPC .................. C08G 2210/009; C08G 2210/0091
See application file for complete search history.

(56) References Cited

U.S. PATENT DOCUMENTS

| | | | | |
|---|---|---|---|---|
| 3,738,946 A * | 6/1973 | Frulla et al. | .......... | B29C 43/003 521/169 |
| 5,990,184 A * | 11/1999 | Biesmans | .................. | C08J 9/28 521/64 |
| 6,069,182 A | 5/2000 | Naber et al. | | |
| 2006/0014846 A1* | 1/2006 | Sparks | ................. | C08G 18/546 521/155 |
| 2012/0259066 A1* | 10/2012 | Bleyen | .................. | C08K 3/346 524/789 |
| 2014/0147607 A1 | 5/2014 | Leventis et al. | | |

FOREIGN PATENT DOCUMENTS

| | | |
|---|---|---|
| CN | 1399659 A | 2/2003 |
| CN | 108368286 A | 8/2018 |
| DE | 19643057 A1 | 4/1998 |
| WO | 9954370 A1 | 10/1999 |
| WO | 2017125415 A1 | 7/2017 |

OTHER PUBLICATIONS

Chinese Application No. 202080025934.4, Office Action mailed Sep. 19, 2022, 13 pages.
Kraitape et al., "Influence of Recycled Polyurethane Polyol on the Properties of Flexible Polyurethane Foams", Energy Procedia, vol. 89, Jun. 17, 2016, pp. 186-197.
Molero et al., "Influence of the Use of Recycled Polyols Obtained by Glycolysis on the Preparation and Physical Properties of Flexible Polyurethane", Journal of Applied Polymer Science, vol. 109, No. 1, Jul. 5, 2008, pp. 617-626.
International Application No. PCT/EP2020/059049, International Search Report and Written Opinion, May 14, 2020, 18 pages.

* cited by examiner

*Primary Examiner* — Melissa A Rioja
(74) *Attorney, Agent, or Firm* — Kilpatrick Townsend & Stockton LLP

(57) ABSTRACT

The present invention relates to a method for preparing a polyurethane foam, in particular an aerogel, from at least one polyisocyanate and at least one optionally recycled polyol, and to the use thereof.

19 Claims, No Drawings

POLYURETHANE AEROGELS

CROSS REFERENCE TO RELATED APPLICATION

This application is a U.S. national phase of International Patent Application No. PCT/EP2020/059049 filed on Mar. 31, 2020, which claims priority to German Patent Application No. 10 2019 204 570.7, filed in Germany on Apr. 1, 2019. The entire contents of both applications are hereby incorporated herein by this reference.

The present invention relates to a method for the preparation of a polyurethane foam, in particular an aerogel, from at least one polyisocyanate and at least one optionally recycled polyol, and to the use thereof.

Polyurethane foams are ubiquitous materials and are intensively used, among others, as cushioning material, filter material, insulation, filler and in vehicle construction. Typically, polyurethanes are based on petrochemical starting materials.

Aerogels are highly porous solids in which up to 99.98% of the volume consists of pores. There are various types of aerogels, with those based on silicates being the most common. Other materials, such as those based on plastics or carbon, are known. In principle, all metal oxides, polymers and some other materials can be used as a starting basis for aerogel synthesis by a sol-gel process.

Diascorn et al. (*J Supercrit Fluids*, 2015, 106, 76) describe the preparation of polyurethane aerogels from pentaerythritol with a purity of >98% and diphenylmethane diisocyanate oligomer via a sol-gel process.

US 2014/0147607 discloses the preparation of porous PU particles on the basis of polyisocyanates and known polyol solids such as resorcinol.

The disadvantage of the methods described above is that they are based on petrochemical educts, which appear to be outdated, in particular in times of increasing resource scarcity, but also in view of the problem of rising environmental pollution.

In the ongoing sustainability debate, alternative educts, e.g. from recycling processes, are gaining in importance. Recycling of plastics includes the mechanical, thermal or chemical degradation of plastics. However, often only clean, homogenous plastics can be recycled. In addition, the possibilities for reusing recycled compounds are limited due to their property profile. For example, only polyols with a limited property profile in terms of OH number, acid number, reactivity, viscosity, water content and impurity content can be obtained from homogenous PU waste, which in turn severely limits their field of application. In the recycling of non-homogenous PU waste, the situation is even further complicated by the fact that the polyols obtained may be contaminated and vary in their material properties. Often, such recyclates cannot be used or can only be used to manufacture products of inferior quality.

Despite the high demand for materials from alternative educt sources, there is a lack of a ready market for recycled polyols at the present time. Therefore, there is an urgent need to develop methods that can, under economic conditions, recycle polyols from sometimes contaminated and/or unsorted plastic waste, such as disposed mattresses or production waste, back into the value chain and enable the production of polyurethanes from recycled educts.

Surprisingly, recycled polyols were found to be suitable for the production of high-quality PU foams and, in particular, PU aerogels. The properties of the recycled polyols, such as high viscosity and heterogeneity, which were considered disadvantageous in the prior art, do not make a difference or even lead to better properties in the production of polyurethane foams and in particular aerogels according to the invention.

A first aspect of the present invention therefore relates to a method for producing a polyurethane foam (PU foam) comprising the steps of
- mixing at least one polyol and at least one solvent L1,
- (ii) optionally separating solids from the mixture obtained in step (i),
- (iii) adding at least one polyisocyanate and optionally at least one adjuvant to the mixture obtained in step (i) or (ii),
- (iv) forming a gel from the mixture obtained in step (iii),
- (v) optionally at least partially replacing the at least one solvent L1 by at least one solvent L2, and
- (vi) at least partially removing the at least one solvent L1 and/or L2.

The method according to the present invention relates to the production of a polyurethane foam which preferably has a porosity of, for example, 55-99%, more preferably 75-90%. The porosity is determined from the quotient of the envelope density (based on the volume of the solid including the pores present) to the skeletal density (based on the volume of the solid excluding the pores present). Suitable measurement methods are known in the prior art and comprise, for example, liquid or helium pycnometry.

The envelope density of the polyurethane foam may be 100-500 kg/m$^3$, preferably 120-350 kg/m$^3$ and more preferably 120-250 kg/m$^3$. The specific inner surface area can be 50-500 m$^2$/g and preferably 100-300 m$^2$/g, measurements taken in accordance with DIN ISO 9277.

The mean pore diameter of the PU foam according to the present invention can be less than 500 nm, preferably less than 200 nm, more preferably less than 150 nm, even more preferably 50-200 nm, even more preferably 10-100 nm and even more preferably 10-50 nm. The average pore diameter can be determined via gas adsorption using, for example, Nova instruments by Quantachrome Instruments.

The cumulative pore volume fraction is, for example, at least 0.25 cm$^3$/g and preferably 0.3-3.0 cm$^3$/g, whereby measurements are carried out by nitrogen adsorption followed by Barret-Joyner-Halenda (BJH) evaluation. The cumulative pore volume fraction can be determined via gas adsorption using, for example, Nova instruments by Quantachrome Instruments.

The thermal conductivity of the PU foam according to the present invention can be less than 75 mW/mK, preferably 12-55 mW/mK and more preferably 16-35 mW/mK, measured at room temperature via the Transient Hot Bridge method. Thermal conductivity using the Transient Hot Bridge method can be carried out, for example, using the THB1 or THB100 model from Linseis Messgeräte.

In particular, the PU foam according to the present invention is an aerogel. Preferably, the aerogels are open-pored.

The PU foam may further contain, in addition to urethane groups, isocyanurate, carbodiimide, allophanate, urea, uretdione, iminooxadiazinedione, uretonimine groups or mixtures thereof, in particular isocyanurate groups.

Step (i) of the method according to the invention comprises mixing at least one polyol and at least one solvent L1.

The term "polyol" refers to compounds having at least 2 hydroxy groups. Suitable polyols are selected, for example, from polyether polyols, polyester polyols, alkylene glycols, alkylene polyols and mixtures thereof. Preferred polyols have a weight average molecular weight of 50-400,000 g/mol, more preferably 100-20,000 g/mol. In one embodiment, a polyol is used in step (i). The polyol may be present at a purity of ≥90%, preferably ≥95%, more preferably 98%. In another embodiment, a polyol mixture of two or more polyols is used in step (i).

The polyol may have a hydroxyl number (OH number) of 50-600 mg KOH/g, preferably 100-300 mg KOH/g measured according to ASTM E 1899-80. The total OH number of the polyols used in component (i) is preferably 50-600 mg KOH/g, more preferably 100-300 mg KOH/g as measured according to ASTM E 1899-80.

For example, the acid number of the polyol is ≤0.50 mg KOH/g and preferably ≤0.25 mg KOH/g measured according to the manufacturer's instructions Metrohm Application Bulletin No. 200/2 d. The total acid number of the polyols used in component (i) is preferably ≤0.50 mg KOH/g and more preferably ≤0.25 mg KOH/g measured according to the manufacturer's instructions Metrohm Application Bulletin No. 200/2 d.

The water content of the polyol is preferably ≤0.50%, more preferably ≤0.20%, and in particular preferably ≤0.10% measured according to DIN 51777. The total water content of the polyols used in component (i) is preferably ≤0.50%, more preferably ≤0.20%, and in particular preferably ≤0.10% measured according to DIN 51777.

The viscosity of the polyol can be greater than 60,000 mPas, preferably greater than 100,000 mPas and in particular greater than 200,000 mPas measured according to DIN 53019 at 25° C. The total viscosity of the polyols used in component (i) can be greater than 60,000 mPas, preferably greater than 100,000 mPas and in particular greater than 200,000 mPas measured according to DIN 53019 at 25° C.

Surprisingly, it was found that polyols or polyol mixtures can be used in the present method that were obtained by a recycling process from plastics and/or plastic waste based on monomers comprising at least one polyol.

Suitable plastics or plastic wastes based on monomers comprising at least one polyol comprise, for example, polyurethanes, polyisocyanurates, polycarbonates, polylactides, polyhydroxyburates or polyesters, in particular polyurethanes. Suitable plastics or plastic wastes based on monomers comprising at least one polyol comprise, for example, polyurethanes or polyesters, in particular polyurethanes. The plastics or plastic wastes may be homogenous or mixed. For example, the plastics or plastic wastes may be present in the form of disposed mattresses or production wastes, such as chips or offcuts. For example, the polyols used in step (i) can be obtained by alcoholysis, such as methanolysis or glycolysis, or aminolysis of plastics or plastic wastes. Methanolysis is the chemical degradation of plastics or plastic wastes to their monomers or oligomers in methanol, which preferably takes place at elevated temperature and/or elevated pressure. Glycolysis is the chemical degradation of plastics or plastic wastes to their monomers or oligomers in the presence of a glycol, for example diethylene glycol, preferably at elevated temperature and/or elevated pressure. Where appropriate, alcoholysis involves the use of a suitable catalyst, for example a metal catalyst, e. g. potassium acetate, or an amine, e. g. diethanolamine. Aminolysis is the chemical degradation of plastics or plastic wastes to their monomers or oligomers in the presence of an amine, for example a diamine or hydroxylamine such as ethanolamine, preferably at elevated temperature and/or elevated pressure. Where appropriate, a suitable catalyst such as a metal catalyst is used in the aminolysis.

In general, a suitable recycling process may comprise the steps of
(I) providing at least one plastic or plastic waste in alcohol, preferably methanol, ethanol and/or glycol, and/or amine, in particular diamine, and/or hydroxylamine, such as ethanolamine;
(II) optionally adding at least one catalyst;
(III) treating the mixture obtained in step (I) or (II) at elevated temperature (25-250° C.) and/or elevated pressure (1-50 bar); and
(IV) optionally separating the mixture obtained in step (III).

The recyclate polyols obtained from the recycling process usually have a high viscosity of more than 60,000 mPas, in particular more than 100,000 mPas, measured according to DIN 53019 at 25° C. In addition, the recycled polyols obtained may contain up to 70 wt. %, preferably up to 40 wt. %, more preferably up to 10 wt. %, for example 5-10 wt. %, of insoluble components, such as fillers, dyes, cotton flocks, and/or inorganic fibers such as glass or carbon fibers. Preferably, up to 95 wt %, preferably 80-90 wt % based on the total mass of the obtained recycled polyol comes from residual material. Residual materials in the sense of the present invention are the wastes used in the recycling process, in particular plastic wastes. Such recyclate polyols are usually difficult or impossible to process in conventional processes.

In a preferred embodiment, the at least one polyol used in step (i) originates from a recycling process preferably from the recycling process described above. In a preferred embodiment, the polyol used in step (i) is a recyclate polyol.

The at least one solvent L1 is preferably selected such that the at least one polyol dissolves completely in L1, optionally at elevated temperature, preferably at 25-80° C. The solvent L1 is preferably selected from acetone, ethyl acetate, dimethyl sulfoxide, acetonitrile, ethanol and mixtures thereof. The solvent L1 is more preferably selected from acetone, ethyl acetate, dimethyl sulfoxide, acetonitrile and mixtures thereof.

For example, the mixture obtained in step (i) may be present in the form of a solution or suspension.

Solids may optionally be separated from the mixture obtained in step (i) in step (ii), for example by filtration, decantation or centrifugation. Step (ii) is in particular carried out in the presence of insoluble components as defined above in the mixture obtained in step (i). If necessary, the solid to be separated may also comprise undissolved polyol.

In step (iii), at least one polyisocyanate is added to the mixture obtained in step (i) or (ii). In one embodiment, the at least one polyisocyanate may be dissolved in at least one solvent L3 and may optionally comprise at least one adjuvant. Preferably, the solvent L3 is identical to the solvent L1. For example, a suitable solvent L3 may be acetone, ethyl acetate, dimethyl sulfoxide, acetonitrile, ethanol or a mixture thereof. A suitable solvent L3 is preferably acetone, ethyl acetate, dimethyl sulfoxide, acetonitrile, or a mixture thereof.

The at least one adjuvant may be selected from catalysts, stabilizers, cell regulators, flame retardants, fillers, and mixtures thereof.

For example, suitable catalysts are organic amines, transition metal catalysts, alkali metal catalysts, or mixtures thereof, in particular organic amines such as 1,4-diazabicyclo[2.2. 2]octane which is for example dissolved in dipropylene glycol, hydroxypropyl-2-trimethylammonium formate which is for example dissolved in dipropylene glycol, dibutylbis(dodecylthio)stannane, or potassium 2-ethylhexanoate which is for example dissolved in diethylene glycol. The catalyst content is preferably ≤15 wt %, more preferably ≤5 wt %, even more preferably ≤1 wt % based on the total weight of polyol and polyisocyanate.

Suitable cell regulators are, for example, silicone-based surfactants such as polymethylsiloxane-polyalkylene oxide block polymers.

Suitable fillers are, for example, hollow glass beads, inorganic fibers such as glass or carbon fibers, or mixtures thereof.

The at least one polyisocyanate may have a total isocyanate content of 25-40%, preferably 27-35%, more preferably 30.5-32.5%, and may optionally be selected from aliphatic, cycloaliphatic or aromatic polyisocyanates.

The polyisocyanate is preferably selected from hexamethylene diisocyanate, isophorone diisocyanate, methylene bis(4-cyclohexyl isocyanate), 2,4-cyclohexyl isocyanate, 2,6-cyclohexyl diisocyanate, toluene diisocyanate (TDI), (polymeric) diphenylmethane diisocyanate (MDI), naphthylene-1,5-diisocyanate (NDI), 4,4',4"-triphenylmethane triisocyanate, and mixtures thereof.

The molar ratio of isocyanate groups to isocyanate reactive groups, such as hydroxy or amino group, in step (iii) is preferably 10:1-1:1 and in particular 5:1-1:1.

Step (iii) is preferably carried out with stirring.

Step (iv) comprises forming a gel from the mixture obtained in step (iii). Step (iv) may be carried out at room temperature, i. e. at 20° C., or at elevated temperatures, i. e. >20° C. Preferably, the temperature in step (iv) is 20-70° C., more preferably 20-60° C., in particular 20-50° C. In one embodiment, step (iv) is carried out at atmospheric pressure, i. e. at about 1 bar. In another embodiment, step (iv) is carried out at elevated pressure, i. e. >1 bar, such as >1-60 bar.

In one embodiment, step (iv) is carried out preferably in a solvent-gas atmosphere.

In one embodiment, step (iv) is carried out preferably in a closed system. This prevents uncontrolled evaporation of the solvent.

In one embodiment, the formation of a gel takes place in a mold, in particular in a closed mold, wherein the mixture obtained in step (iii) can be transferred to the mold, for example by casting. Preferably, the gel formation takes place while the mixture obtained in step (iii) is at rest, i. e. no shear acts on the mixture.

In another embodiment, the formation of a gel is carried out under the action of shear energy on the mixture obtained in step (iii). Shear energy can be provided, for example, by agitation, e. g. by a dissolver, atomization, e. g. in a spray drying process, granulation, e. g. in a fluidized bed reactor, or extrusion, e. g. using a wet spinning technique.

Preferably, a gel forms after about 3 min-24 h, more preferably after about 3-60 min, even more preferably after 5-15 min.

Step (iv) may be carried out in the presence of a solid insoluble in the mixture obtained in step (iii), particularly if composite materials are to be prepared. The solid may be present, for example, in the form of a fiber, nonwoven, fiber mat, or any other three-dimensional structure, such as a honeycomb structure.

In step (v), at least partial replacement of the at least one solvent L1 with at least one solvent L2 is carried out. The at least partial replacement may be carried out by rinsing the gel obtained in step (iv) with at least one solvent L2. The solvent L2 may comprise, for example, liquid or supercritical $CO_2$. In one embodiment, L2 is a solvent mixture comprising liquid or supercritical $CO_2$ and a further solvent such as acetone, isopropanol, ethanol, or a mixture thereof. In a preferred embodiment, L2 is liquid or supercritical $CO_2$, in particular supercritical $CO_2$.

An at least partial replacement of the solvent in the sense of the present invention means a replacement of at least 50%, preferably at least 90% of the solvent L1 by the at least one solvent L2. If the gel obtained in step (iv) comprises at least one solvent L3 in addition to the at least one solvent L1, the previous statements regarding step (v) are to be applied analogously to the mixture of L1 and L3.

Step (v) can be carried out under elevated pressure, i. e. >1 bar. Preferably, the pressure in step (v) is at least equal to the critical pressure of the solvent or solvent mixture L1, L2 and/or L3. Preferably, the pressure in step (v) is in a range of 70-140 bar.

In step (vi), the at least one solvent L1 and/or L2 is at least partially, preferably completely, removed. If the gel obtained in step (iv) comprises at least one solvent L3 in addition to the at least one solvent L1, step (vi) comprises at least partial removal of the at least one solvent L1, L2 and/or L3. At least partial removal means removal of at least 80%, preferably at least 90%, more preferably at least 95% of the at least one solvent L1, L2 and/or L3. Optionally, the removed solvent L1, L2 and/or L3 can be collected and fed to the method according to the present invention as recycled solvent in anyone of steps (i), (iii) or (v), respectively. Optionally, the excipient, if any, can also be removed in step (vi) and recycled to the method according to the present invention.

Step (vi) can be carried out in particular by depressurizing or evaporating the solvent L1, L2 and/or L3 at elevated temperature, preferably at 25-60° C. Evaporation of the solvent L1, L2 and/or L3 can be carried out at constant temperature or with the application of a temperature gradient, for example in a two-step process. Surprisingly, it has been shown that a polyurethane foam according to the present invention can be obtained both by depressurizing and by evaporating the at least one solvent L1, L2 and/or L3 without causing collapse of the porous PU network.

In another aspect, the present invention relates to a polyurethane foam obtainable by a process as described above. The polyurethane foam may be, for example, in the form of a sheet, powder, fiber, paper, tape, film or nonwoven. The porosity of the polyurethane foam according to the invention may be, for example, 55-99%, preferably 75-90%; the envelope density may be 100-500 kg/m$^3$, preferably 120-350 kg/m$^3$, and more preferably 120-250 kg/m$^3$. The specific inner surface area can be 50-500 m$^2$/g and preferably 100-300 m$^2$/g, measured by means of nitrogen adsorption followed by BET evaluation according to DIN ISO 9277.

The mean pore diameter of the PU foam according to the present invention can be less than 500 nm, preferably less than 150 nm, preferably 10-100 nm and more preferably 10-50 nm. The mean pore diameter can be determined, for example, by gas adsorption using the Nova instruments from Quantachrome Instruments.

For example, the cumulative pore volume fraction is at least 0.25 cm$^3$/g and preferably 0.3-3.0 cm$^3$/g, measured by means of nitrogen adsorption followed by Barret-Joyner-Halenda (BJH) evaluation. The cumulative pore volume fraction can be determined via gas adsorption using, for example, the Nova instruments from Quantachrome Instruments. The thermal conductivity of the PU foam according to the present invention can be less than 75 mW/mK, preferably 12-55 mW/mK and more preferably 16-35 mW/mK, measured at room temperature via the Transient Hot Bridge method. Thermal conductivity using the Transient Hot Bridge method can be carried out, for example, using the THB1 model from Linseis Messgeräte. In particular, the PU foam according to the present invention is an aerogel. In addition to urethane groups The PU foam may further contain isocyanurate, carbodiimide, allophanate, urea, uretdione, iminooxadiazinedione, uretonimine groups, or mixtures thereof.

In another aspect, the present invention relates to the use of a polyol, in particular a recycled polyol, having a viscosity of >60,000 mPas, preferably >100,000 mPas, more preferably >200,000 mPas, according to DIN 53019 at 25° C., and optionally a water content of ≤0.50%, preferably ≤0.20% according to DIN 51777 and/or an acid number of ≤0.50 mg KOH/g, preferably ≤0.25 mg KOH/g according to the manufacturer's instructions Metrohm Application Bulletin No. 200/2 d for the production of a polyurethane foam, in particular a polyurethane aerogel.

The recyclate polyols have already been described above.

In a further aspect, the present invention relates to the use of the polyurethane foam according to the present invention as a thermal insulator, lightweight filler, or in a composite material, in particular as a matrix in a composite material.

Furthermore, the present invention relates to the use of the polyurethane foam according to the invention as an adsorbent. Due to its large inner surface area, the PU foam according to the present invention can selectively enrich substances from gaseous or liquid mixtures at its interface and can thus be used, for example, for cleaning. Furthermore, the present invention relates to the use of the polyurethane foam according to the present invention as an absorbent, for example for absorbing gases.

Furthermore, the present invention will be explained by the following examples.

EXAMPLE 1: PRODUCTION OF A RECYCLED POLYOL

For the production of a recycled polyol, non-homogenous polyurethane chips from the production of polyurethane sheets were degraded by glycolysis. For this purpose, about 10 wt % glycol and 0.2 wt % metal catalyst, based on the amount of polyurethane waste used, were placed in a reaction vessel and heated to about 210° C. Subsequently, the polyurethane waste was added successively under constant stirring. After complete addition, the reaction was stirred at constant temperature for two hours. The reaction mixture was filtered to separate coarse insoluble fractions.

The obtained recyclate had a residual content of 80-90 wt %, an acid number of <0.50 mg KOH/g, a water content of <0.50%, and a viscosity of >200,000 mPas at 25° C.

EXAMPLE 2: PREPARATION OF A POLYURETHANE FOAM 4.17 g of the recycled polyol obtained in Example 1 were dissolved in 0.73 mol acetone. To the solution, $3.17 \times 10^{-4}$ mol of catalyst (1,4-diazabicyclo[2.2.2]octane dissolved in dipropylene glycol) was added with stirring. MDI was then added with stirring at 4.8 vol % (relative to acetone). Gel formation was carried out while resting in a closed reaction vessel at room temperature for at least 60 min, after which the obtained gel was supercritically dried at 50° C. and 120 bar.

The obtained PU foam had a porosity of 85%.

EXAMPLE 3: PREPARATION OF A POLYURETHANE FOAM 1.92 g of the recycled polyol obtained in Example 1 was dissolved in 0.77 mol acetone. To the solution, 0.001 mol of catalyst (1,4-diazabicyclo[2.2.2]octane dissolved in dipropylene glycol) was added with stirring. In the following, 4 vol % (relative to the acetone) MDI was added under stirring. Gel formation was carried out while resting in a closed reaction vessel at room temperature for 40 min, after which the obtained gel was atmospherically dried to conditions of 20° C. and 1 bar.

The obtained PU foam had a porosity of 90%, a specific inner surface area of about 160 $m^2/g$ and an average pore diameter of 20 nm.

The following items are subject-matter of the present invention:

1. A method for producing a polyurethane foam comprising the steps:
   (i) mixing at least one polyol and at least one solvent L1,
   (ii) optionally separating solids from the mixture obtained in step (i),
   (iii) adding at least one polyisocyanate and optionally at least one adjuvant to the mixture obtained in step (i) or (ii),
   (iv) forming a gel from the mixture obtained in step (iii),
   (v) optionally at least partially replacing the at least one solvent L1 by at least one solvent L2, and
   (vi) at least partially removing the at least one solvent L1 and/or L2.
2. The method according to item 1, wherein the foam has a porosity of 55-99%, preferably 75-90%.
3. The method according to item 1 or 2, wherein the foam has a density of 100-500 $kg/m^3$, preferably of 120-350 $kg/m^3$, more preferably of 120-250 $kg/m^3$.
4. The method according to any one of the preceding items, wherein the specific inner surface area of the foam is 50-500 $m^2/g$, preferably 100-300 $m^2/g$ and/or the mean pore diameter is less than 500 nm, preferably less than 150 nm, more preferably 10-100 nm and/or the cumulative pore volume fraction is at least 0.25 $cm^3/g$, preferably 0.3-3.0 $cm^3/g$ and/or the thermal conductivity is less than 75 mW/mK, preferably 12-55 mW/mK and more preferably 16-35 mW/m K.
5. The method according to any one of the preceding items, wherein the foam is an aerogel.
6. The method according to any one of the preceding items, wherein the polyurethane contains, in addition to urethane groups, isocyanurate, carbodiimide, allophanate, urea, uretdione, iminooxadiazinedione, uretonimine groups or mixtures thereof.
7. The method according to any one of the preceding items, wherein the polyol has a total hydroxyl number of 50-600 mg KOH/g, preferably 100-300 mg KOH/g measured according to ASTM E 1899-80.
8. The method according to any one of the preceding items, wherein the polyol has a total viscosity greater than 60,000 mPas, preferably greater than 100,000 mPas, more preferably greater than 200,000 mPas measured according to DIN 53019 at 25° C.
9. The method according to any one of the preceding items, wherein the polyol is obtainable by alcoholysis, in particular methanolysis or glycolysis, or aminolysis of plastics based on monomers comprising at least one polyol, in particular wastes of polyurethane, polyisocyanurate, polycarbonate, polylactide, polyhydroxyburate or polyester.
10. The method according to any one of the preceding items, wherein the solvent L1 is selected from acetone, ethyl acetate, dimethyl sulfoxide, acetonitrile, ethanol and mixtures thereof.

11. Method according to any one of the preceding items, wherein the mixture obtained in step (i) is subjected to filtration, decantation or centrifugation in step (ii).
12. The method according to any one of the preceding items, wherein the mixture obtained in step (i) or (ii) is added in step (iii) to a solution of at least one polyisocyanate, at least one solvent L3 and optionally at least one adjuvant.
13. The method according to item 11, wherein the solvent L3 is identical to the solvent L1.
14. The method according to any one of items 12-13, wherein the at least one adjuvant is selected from catalysts, stabilizers, cell regulators such as surfactants, flame retardants, fillers, or mixtures thereof.
15. The method according to item 14, wherein the at least one adjuvant comprises at least one catalyst selected from organic amines, transition metal catalysts, alkali metal catalysts, or mixtures thereof.
16. The method according to any one of the preceding items, wherein the polyisocyanate has a total isocyanate content of 25-40%, preferably 27-35%, more preferably 30.5-32.5%.
17. The method according to any one of the preceding items, wherein the polyisocyanate is selected from aliphatic, cycloaliphatic or aromatic polyisocyanates, in particular hexamethylene diisocyanate, isophorone diisocyanate, methylene-bis(4-cyclohexyl isocyanate), 2,4-cyclohexyl isocyanate, 2,6-cyclohexyl diisocyanate, toluene diisocyanate (TDI), (polymeric) diphenylmethane diisocyanate (MDI), naphthylene-1,5-diisocyanate (NDI), 4,4',4"-triisocyanate triphenylmethane, and mixtures thereof.
18. The method according to any one of the preceding items, wherein step (iv) takes place at temperatures from 20-70° C., preferably 20-50° C.
19. The method according to any one of the preceding items, wherein step (iv) takes place in a solvent-gas atmosphere, preferably in a closed system.
20. The method according to any one of the preceding items, wherein step (iv) takes place in a mold, in particular in a closed mold.
21. The method according to any one of the preceding items, wherein in step (v) the gel obtained in step (iv) is rinsed with at least one solvent L2.
22. The method according to any one of the preceding items, wherein the solvent L2 comprises liquid or supercritical $CO_2$.
23. The method according to any one of the preceding items, wherein step (vi) is carried out by depressurizing or evaporating the solvent L1, L2 and/or L3 at elevated temperature, preferably at 25-70° C.
24. Polyurethane foam obtainable by a method according to any one of items 1-23.
25. A use of a polyol, in particular a recycled polyol, having a viscosity of >60,000 mPas, preferably >100,000 mPas, more preferably >200,000 mPas measured according to DIN 53019 at 25° C. and optionally a water content of ≤0.50% measured according to DIN 51777 and/or an acid number of ≤0.50 mg KOH/g measured according to the manufacturer's instructions Metrohm Application Bulletin No. 200/2 d for the preparation of a polyurethane foam, in particular a polyurethane aerogel.
26. The use of the polyurethane foam according to item 24 as an absorbent, adsorbent, thermal insulator, lightweight filler or in a composite material.

The invention claimed is:

1. A method for producing a polyurethane (PU) foam, comprising:
    obtaining a first mixture by mixing at least one polyol and at least one first solvent, wherein the at least one polyol is obtained by aminolysis or alcoholysis of plastics comprising monomers, said monomers comprising at least one polyol, and has a viscosity greater than 200,000 millipascal-seconds (mPas), measured according to DIN 53019 at 25 degrees Celsius (°0 C.);
    adding at least one polyisocyanate to the first mixture to form a second mixture;
    forming a gel from the second mixture; and
    removing, at least partially, the at least one first solvent from the gel.

2. The method of claim 1, wherein the foam has a porosity of 55-99 percent (%).

3. The method of claim 1, wherein the polyurethane contains urethane groups and one or more of isocyanurate groups, carbodiimide groups, allophanate groups, urea groups, uretdione groups, iminooxadiazinedione groups, or uretonimine groups.

4. The method of claim 1, wherein the at least one polyol obtained by aminolysis or alcoholysis has a total hydroxyl number of 50-600 mg KOH/g, measured according to ASTM E 1899-80.

5. The method of claim 1, wherein the at least one first solvent is selected from one or more of acetone, ethyl acetate, dimethyl sulfoxide, acetonitrile, or ethanol.

6. The method of claim 1, wherein adding the at least one polyisocyanate to the first mixture comprises adding a solution of the at least one polyisocyanate and at least one additional solvent to the first mixture.

7. The method of claim 1, wherein the at least one polyisocyanate has a total isocyanate content of 25-40 weight percent.

8. The method of claim 1, further comprising rinsing the gel with at least one second solvent.

9. A polyurethane foam obtained by a method comprising:
    obtaining a first mixture by mixing at least one polyol and at least one first solvent, wherein the at least one polyol is obtained by aminolysis or alcoholysis of plastics comprising monomers, said monomers comprising at least one polyol, and has a viscosity greater than 200,000millipascal-seconds (mPas), measured according to DIN 53019 at 25 degrees Celsius (°° C.);
    adding at least one polyisocyanate to the first mixture to form a second mixture;
    forming a gel from the second mixture; and
    removing, at least partially, the at least one first solvent from the gel.

10. The method of claim 1, wherein the PU foam is one of an absorbent, an adsorbent, a thermal insulator, a lightweight filler or in a composite material.

11. The method of claim 1, further comprising separating solids from the first mixture.

12. The method of claim 1, wherein obtaining the second mixture further comprises adding at least one adjuvant to the first mixture.

13. The method of claim 1, further comprising partially replacing the at least one first solvent with at least another solvent that is different from the at least one first solvent, wherein removing the at least one first solvent further comprises removing the at least another solvent.

14. The method of claim 1, wherein the at least one polyol obtained by aminolysis or alcoholysis comprises at least one recycled polyol.

15. The method of claim 1, wherein the aminolysis or alcoholysis comprises methanolysis or glycolysis.

16. The method of claim 1, wherein the plastics comprise wastes of polyurethane, polyisocyanurate, polycarbonate, polylactide, polyhydroxyburate or polyester.

17. The method of claim 6, wherein the solution further comprises at least one adjuvant, wherein the at least one adjuvant comprises a catalyst.

18. The method of claim 7, wherein the at least one polyisocyanate comprises one or more of hexamethylene diisocyanate, isophorone diisocyanate, methylene-bis (4-cyclohexyl isocyanate), 2,4-cyclohexyl isocyanate, 2,6-cyclohexyl diisocyanate, toluene diisocyanate (TDI), diphenylmethane diisocyanate (MDI), polymeric MDI, naphthylene-1,5-diisocyanate (NDI), or 4,4',4"-triisocyanate triphenylmethane.

19. The method of claim 1, wherein the at least one polyol obtained by aminolysis or alcoholysis has has one or more of (A) a water content of less than or equal to 0.50 weight percent measured according to DIN 51777 or (B) an acid number less than or equal to 0.50 mg KOH/g measured according to Metrohm Application Bulletin No. 200/2 d.

\* \* \* \* \*